United States Patent [19]

Grana et al.

[11] 4,415,311
[45] Nov. 15, 1983

[54] VERTICAL SHAFT WINDMILL

[75] Inventors: David C. Grana, Hampton; Spencer V. Inge, Jr., Poquoson, both of Va.

[73] Assignee: The United States of America as represented by the Administrator of the National Aeronautics and Space Administration, Washington, D.C.

[21] Appl. No.: 383,063

[22] Filed: May 28, 1982

[51] Int. Cl.³ .............................................. F03D 7/06
[52] U.S. Cl. ................................ 416/117; 416/132 B
[58] Field of Search .................... 416/132 B, 117, 119

[56] References Cited

U.S. PATENT DOCUMENTS

| 193,954 | 8/1877 | Hodges | 416/117 X |
| 590,753 | 9/1897 | Flaig | 416/117 X |
| 2,094,941 | 10/1937 | Burkhartsmeier | 416/132 B X |
| 2,439,575 | 4/1948 | Morris | 416/117 |

FOREIGN PATENT DOCUMENTS

| 2324604 | 12/1974 | Fed. Rep. of Germany | 416/117 |
| 2913407 | 10/1980 | Fed. Rep. of Germany | 416/11 |
| 636277 | 4/1928 | France | 416/132 B |
| 694511 | 12/1930 | France | 416/117 |
| 1000102 | 2/1952 | France | 416/132 B |

Primary Examiner—Everette A. Powell, Jr.
Attorney, Agent, or Firm—Howard J. Osborn; John R. Manning; William H. King

[57] ABSTRACT

A vertical shaft 11 has several equally spaced blades 14 mounted thereon. Each blade consists of an inboard section 15 and an outboard section 16 skew hinged (17) to the inboard section. The inboard sections automatically adjust their positions with respect to the fixed inboard sections with changes in velocity of the wind. This windmill design automatically governs the maximum rotational speed of shaft 11.

3 Claims, 2 Drawing Figures

VERTICAL SHAFT WINDMILL

ORIGIN OF THE INVENTION

The invention described herein was made by employees of the U.S. Government and may be used by or for the Government for governmental purposes without the payment of any royalties thereon or therefor.

BACKGROUND OF THE INVENTION

The invention relates to a windmill design and more specifically concerns an improved vertical shaft windmill design that automatically governs its maximum rotational speed in high winds.

Windmills without controls to control their maximum rotational speed are susceptible to high wind damage. Prior devices for controlling maximum rotational speed generally consists of friction brakes, hand operated stops, gears, and electrical mechanical speed control devices. These prior art devices are usually expensive, cumbersome, and require periodic adjustments, maintenance and replacement.

It is an object of this invention to provide a simple, inexpensive windmill requiring no periodic maintenance for automatically controlling the maximum rotational speed.

Another object of this invention is to provide a windmill having load releasing devices when abrupt changes in wind occur.

Other objects and advantages of this invention will become apparent hereinafter in the specification and drawings.

SUMMARY OF THE INVENTION

A windmill consisting essentially of a vertical shaft with several equally spaced blades mounted thereon. Each blade consists of an inboard section attached to the shaft and an outboard section skew hinged to the inboard section. The outboard sections automatically adjust their positions with respect to the fixed inboard sections with changes in velocity of the relative wind. When the wind reaches a certain velocity the inboard sections and the outboard sections wil form flat surfaces. Hence, any further increase in the wind velocity will not increase the rotational speed of the shaft. With the outboard sections in downward positions any abrupt changes in wind will move most of the outboard sections upward thereby releasing part of the load and thereby protecting the windmill.

DETAILED DESCRIPTION OF THE INVENTION

Figure 1:
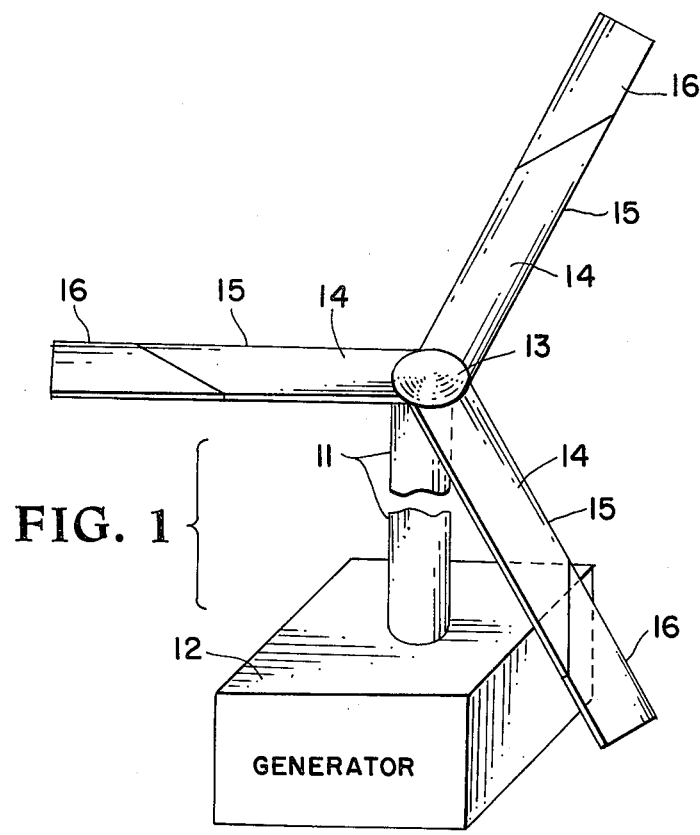
FIG. 1 is a schematic drawing of the invention.
Figure 2:
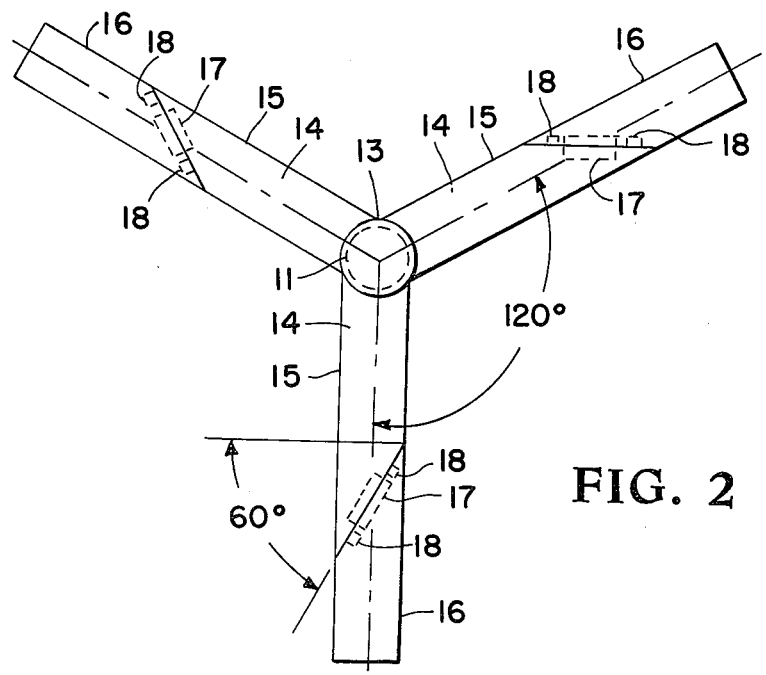
FIG. 2 is a drawing of a top view of the invention for the purpose of describing the mechanical details.

Turning now to the embodiment of the invention selected for illustration in the drawings, the number 11 in FIG. 2 designates a vertical shaft that is suitably attached to a generator 12 for generating electrical power when shaft 11 rotates. Attached to the upper end of shaft 11, by means of a cap 13, are three blades or vanes 14. Each blade 14 consists of an inboard section 15 and an outboard section 16 which are hinged together.

As shown in FIG. 2, blades 14 are spaced 120° apart or are equally spaced around vertical shaft 11. The line between sections 15 and 16 of each blade 14 makes a 60° angle with a line perpendicular to the centerline of the blade. Outboard section 16 is hinged to inboard section 15 by a suitable hinge 17. Hinge 17 restricts the movement of section 16 in the upper direction to the position shown and stops 18 are provided for restricting the movement of section 16 in the downward direction to where it is perpendicular to section 15. That is, section 16 is restricted in its movement from the flat position shown to a position where section 16 is perpendicular to section 15.

In the operation of this invention, with no wind and with shaft 11 not rotating, sections 16, due to gravity, will be in positions perpendicular to sections 15. Then when the wind begins to blow in any direction, at least one of the sections 16 will be forced against its corresponding section 15 thereby creating a rotational force on shaft 11 causing it to rotate. The rotation of shaft 11 creates a centrifugal force on sections 16 which tend to move them to their flat positions. Before they reach their flat positions the wind will apply some force to sections 16. Once the sections reach their flat positions the rotational speed of shaft 11 will not increase with increases in wind velocity. Therefore, this invention automatically governs its maximum rotational speed and hence will not damage itself in extremely high winds. In addition, the outboard sections 16 are load release devices which protect the windmill when abrupt changes in the wind occur.

The advantages of this invention are that it provides an improved windmill design which automatically governs its maximum rotational speed thereby protecting itself against high rotational speed damage in high winds and which affords protection when abrupt changes in wind direction and velocity occur.

Various changes and additions can be made in the illustrated embodiment without departing from the invention. For example, more than three blades can be used, however, at least three must be used. If more than three blades are used they should be equally spaced and therefore would have less that a 120° spacing. The angle between the line between sections 15 and 16, and a line perpendicular to the centerline of blade 14 can be values between 0° and 90° other than the 60° shown. Sections 16 can be made from material that is heavier or lighter than the sections 15 material or weights can be added to sections 16 to change the maximum rotational speed of the invention. Also two or more of the windmill designs shown in FIG. 2 can be spaced along vertical shaft 11. If two or more are used they can be aligned or offset angularly with respect to each other.

What is claimed is:
1. An improved windmill design comprising:
a vertical shaft mounted for rotation;
several straight elongated horizontal flat surface blades attached to said vertical shaft and radiating therefrom with the centerline of each blade from end to end is on a straight line that passes through the center of said shaft;
each of said blades separated into an inboard section attached to said vertical shaft with its flat surface up and an outboard section said inboard section and outboard section separated along a straight line making an angle of greater than zero and less than 90° with a line perpendicular to the centerline of said blade;

hinge means for hinging said outboard section to said inboard section along said straight line making an angle greater than zero and less than 90° with a perpendicular to the centerline of said blade; and said hinge means including means for restricting the motion of said hinge means between a position where the combined outboard section and inboard section form a flat surface and the position where the outboard section surface is at a 90° angle with the inboard section surface when the weight of said outboard section hinges it downward;

whereby whenever said windmill is at rest all of said outboard sections will be perpendicular to said inboard sections and then when the wind begins to blow at least one of said outboard sections will be forced against its corresponding inboard sections creating a torque on said shaft causing it to rotate and whenever the velocity of the wind increases to a certain level the centrifugal force will cause all inboard sections to be hinged to their flat positions resulting in no increased torque on the shaft with further increases in wind velocity.

2. An improved windmill design according to claim 1 wherein there are three of said blades that are spaced 120° apart around said shaft.

3. An improved windmill design according to claim 2 wherein said straight line separating the inboard and outboard sections makes a 60° angle with a line perpendicular to the centerline of said blade.

* * * * *